United States Patent [19]

Ishii et al.

[11] Patent Number: 5,262,859
[45] Date of Patent: Nov. 16, 1993

[54] VIDEO SIGNAL TRANSMITTER/RECEIVER

[75] Inventors: Kanjuu Ishii, Yokohama; Shigenori Onaka, Yokosuka, both of Japan

[73] Assignee: Victor Company of Japan, Ltd., Yokohama, Japan

[21] Appl. No.: 869,496

[22] Filed: Apr. 16, 1992

[30] Foreign Application Priority Data

Apr. 17, 1991 [JP] Japan .................................. 3-112476

[51] Int. Cl.$^5$ ........................ H04N 7/08; H04N 7/18; H04N 5/268
[52] U.S. Cl. ..................................... 358/142; 358/108; 358/181; 340/825.24
[58] Field of Search .................. 358/142, 173, 171, 40, 358/39, 181, 108; 340/825.24

[56] References Cited

U.S. PATENT DOCUMENTS

| | | | |
|---|---|---|---|
| 3,955,047 | 5/1976 | Willis | 358/173 |
| 4,581,644 | 4/1986 | Deiss | 358/181 |
| 4,891,703 | 1/1990 | Noudan | 358/142 |
| 5,070,404 | 12/1991 | Bullock et al. | 358/142 |
| 5,134,483 | 7/1992 | Imbert et al. | 358/181 |

OTHER PUBLICATIONS

Y. Nagaoka, M. Tsuruta and H. Fujiwara, "High Performance VTR based on the S-VHS Format", IEEE Transactions on Consumer Electronics, vol. 34. No. 3, pp. 560-565 (1988).

Primary Examiner—John K. Peng
Attorney, Agent, or Firm—Michael N. Meller

[57] ABSTRACT

A video signal transmitter/receiver apparatus and method is provided for automatically switching the aspect ratio at a receiving device. A video transmitter outputs a chrominance signal and a luminance signal separately, and converts the chrominance signal into a low impedance. A transistor and resistive divider network superpose a DC voltage controlled by an aspect ratio control signal on an output signal. A receiving unit inputs the chrominance signal and the luminance signal separately and comprises a discrimination circuit that detects the DC control voltage superposed on the chrominance signal.

12 Claims, 1 Drawing Sheet

VIDEO SIGNAL TRANSMITTER/RECEIVER

BACKGROUND OF THE INVENTION

Recent developments in television video quality include the "Super-VHS" video recording/playback system. In the "Super-VHS" video recording/playback system the luminance and chrominance signals are processed separately from each other. The input and output terminals of the various video units use the "S-terminals" which is an industry standard designation. The use of separate luminance and chrominance channels maximizes the video quality by eliminating the interference between the luminance and chrominance signals commonly prevalent in composite signals comprising a mixture of the luminance and chrominance signals.

In addition, as television screens are becoming ever larger, more and more video units now allow the user to switch the aspect ratio, the ratio of the picture width to the picture height as defined by the active picture, from 4:3 used in conventional television units to 16:9 used in newer systems. In order that the output of a video tape recorder, when in the playback mode, can be viewed on a screen with the desired aspect ratio, the aspect ratio changeover operation has had to be performed manually.

SUMMARY OF THE INVENTION

The purpose of this invention is to provide a video signal transmitter/receiver apparatus that can switch a desired function automatically in a video system using a simple configuration.

With this invention, because a video signal with a control signal superposed is transmitted and the control signal superposed on the received signal is discriminated at the receiver, the control signal can be simultaneously transmitted on a transmission path.

In a preferred embodiment the invention is provided in several configurations to resolve the problem of control signal transmission described above.

A video signal transmitter apparatus designed for transmitting a video signal superposed with a control signal includes means to convert a high impedance video signal into low impedance video signal. Means are provided to superpose a control signal onto the video signal and a means for delivering the video signal with the control signal superposed are included in the transmitter apparatus In a further preferred embodiment a video signal receiver apparatus for receiving superposed control signal for producing a desired video display includes a means for detecting control signals from a video signal carrying the superposed control signal. Means are included for delivering the detected control signals to a control device within a video display device and means for delivering the video signal to the video device are provided in the receiver apparatus.

In a further embodiment the control signal is an ON-/OFF DC signal superposed on the chrominance channel. This control signal is used for automatically controlling the aspect ratio of a display device.

When two devices using the "Super-VHS" television industry standard are interconnected, they use the "S-terminals" for the interconnection. The "S-terminals" consist of two terminals, one to transmit the luminance signal and one to transmit the chrominance signal. The use of two separate transmission paths for each component of the video signal eliminates the video quality degradation commonly present with a composite signal containing the luminance and chrominance signals combined. When two video units are equipped with "S-terminals" in accordance with the principles of this invention, the transmitting side video unit (e.g. Video Cassette Recorder) transmits a ON/OFF DC control voltage superposed on the chrominance signal. The receiving side video unit (e.g. TV receiver or monitor) discriminates the ON/OFF DC control voltage superposed on the chrominance signal. This superposing of a ON/OFF DC control voltage representing aspect ratio information on the chrominance information permits automatic control of the aspect ratio of the receiving device.

DESCRIPTION OF THE PREFERRED EMBODIMENTS

The preferred embodiments will be described below with reference to the drawings.

Figure 1:
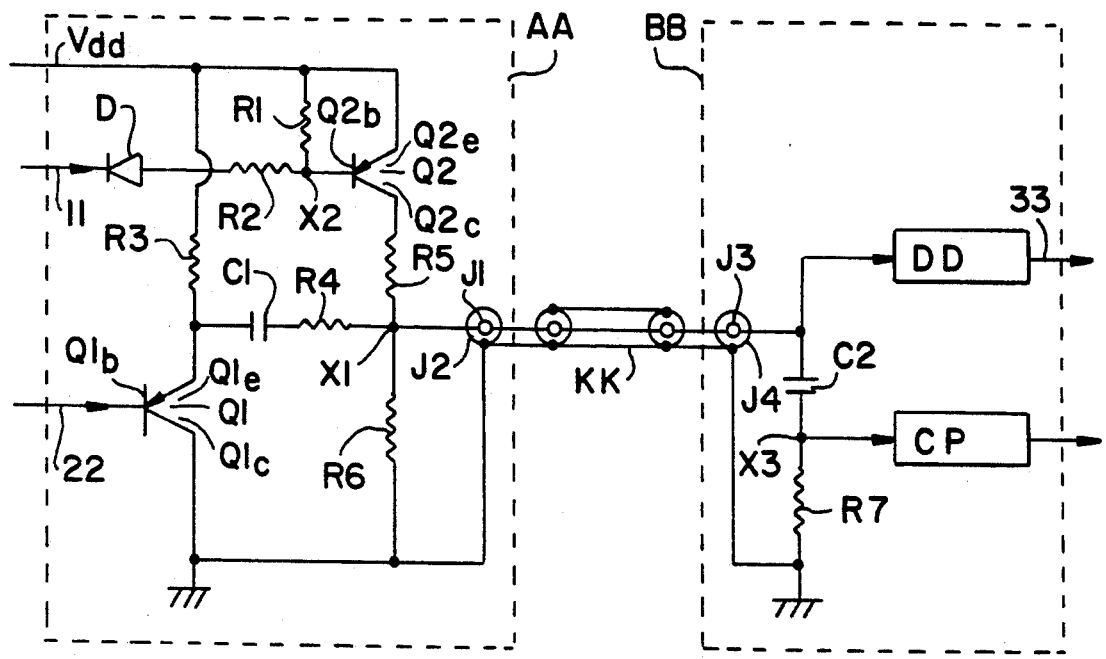
FIG. 1 is a schematic diagram of a preferred embodiment of the present invention.

Referring to FIG. 1, the chrominance signal 22 is supplied to the base Q1b of a first PNP transistor Q1 whose collector Q1c is grounded. Signal 22 is converted into a low impedance signal and passed on from the emitter Q1e which is connected to one end of a third resistor R3. The other end of resistor R3 is coupled to a power source $V_{dd}$. The low impedance signal from Q1e is transmitted to a junction point X1 via a first capacitor C1 and a fourth resistor R4. One end of C1 is connected to emitter Q1e and the other end is connected to one end of the fourth resistor R4. The other end of R4 is connected to the junction point X1.

An aspect ratio control signal 11 is applied to the cathode side of a diode D whose anode side is coupled to one end of a second resistor R2. The aspect ratio control signal is HIGH when the aspect ratio is 4:3 and LOW when the aspect ratio is 16:9. The signal is passed on, via the diode D and the second resistor R2 to a junction point X2. X2 is the junction point to which the other end of the second resistor R2, one end of a first resistor R1 (the other end of R1 is connected to the power source $V_{dd}$), and the base Q2b of a second PNP transistor Q2 are coupled respectively.

If the aspect ratio control signal 11 remains LOW representing a 16:9 aspect ratio, the diode D is conducting and the potential of the base Q2b becomes 0.7 volt lower than that of the power source $V_{dd}$, thereby causing the second PNP transistor Q2 to turn on. Under these conditions, the potential of the collector Q2c of the second PNP transistor Q2, whose emitter Q2e is coupled to the power source $V_{dd}$, becomes lower than that of the power source $V_{dd}$ by 0.3 volt, which is the saturation voltage of the second PNP transistor Q2.

The junction point X1 is also connected to one end of a fifth resistor R5, whose other end is connected to the collector Q2c, as well as to one end of a sixth resistor R6. The other end of R6 is grounded. Thus, the potential of the junction point X1 assumes a value equivalent to the potential of the collector Q2c divided ratio of the fifth resistor R5 to the sixth resistor R6.

Thus, an ON/OFF DC control voltage is superposed on the chrominance signal and represents an aspect ratio of 16:9.

If the aspect ratio control signal 11 is kept HIGH, representing a 4:3 aspect ratio, the base Q2b voltage is substantially equal to the voltage of power source $V_{dd}$ because the diode D is inversely biased. This causes the second PNP transistor Q2 to turn off. Under these conditions, the collector Q2c remains at a high impedance, and the potential of the junction point X1 is connected to ground potential via the sixth resistor R6.

The average potential of the chrominance signal 22 becomes equal to the ground potential when the aspect ratio is 4:3, and consequently, no DC voltage is superposed on the chrominance signal.

The junction point X1 is coupled to the chrominance signal output terminal J1 which is one of the S-terminals. The chrominance signal ground terminal J2 (a part of the S-terminals), is grounded. The chrominance signal output terminal J1 and the chrominance signal ground terminal J2 are linked, respectively, to the chrominance signal input terminal J3 and the chrominance signal ground terminal J4, through a connecting cable KK, where the terminals J3 and J4 are parts of the S-terminals of the receiving side video unit BB.

The chrominance signal 22 along with the superposed aspect ratio control signal is transmitted from the sending side video unit AA to the receiving side video unit BB, and at the same time, the ground potential of the sending side video unit AA and that of the receiving side video unit BB become equal to each other.

The chrominance signal ground input terminal J4, among the S-terminals, is connected to ground. The chrominance signal input terminal J3 is coupled to a DC voltage discrimination circuit DD and to one end of a second capacitor C2, whose other end is coupled to a junction point X3. This supplies the chrominance signal 22 to the chrominance processing CP portion of receiving side video unit BB.

The input of the DC voltage discrimination circuit DD has a high impedance, for example, where it is applied to a field-effect transistor. The discrimination circuit output signal 33, obtained by discriminating the DC voltage superposed on the chrominance signal 22, is supplied to a control circuit, not shown, that controls the aspect ratio of the receiving side video unit BB. The chrominance signal 22 supplied to the junction point X3 through the second capacitor C2, is terminated with a seventh resistor R7 and applied, at the same time, to the known chrominance signal processing circuit CP.

The output impedance of the sending side video unit AA and the input impedance of the receiving side video unit BB are described next. The AC output impedance is determined by the fourth resistor R4 which may be 75 ohms, for example. Also, the DC output impedance is determined by a parallel resistor combination consisting of the fifth resistor R5 and the sixth resistor R6. For example, suppose the fifth resistor R5 and sixth resistor R6 have the resistance values of 10k ohms and 200k ohms respectively. The DC output impedance is 10k ohms. It is more effective to select a far larger resistance value for the sixth resistor R6 than that of the fifth resistor R5, since that makes it easy for the DC voltage discrimination circuit DD to discriminate the DC voltage superposed on the chrominance signal.

The AC input impedance is determined by the seventh resistor R7 and a value of which is preferred to be equal to that of the fourth resistor R4, 75 ohms for example. Moreover, the DC input impedance is a high impedance that is determined by the input impedance of the DC voltage discriminating circuit DD. For example, where a field-effect transistor is employed at the input of the DC voltage discrimination circuit DD, the DC input impedance can be several hundred k ohms.

The chrominance signal 22 has an AC output impedance of 75 ohms and is terminated at an AC input impedance of 75 ohms. Likewise, the aspect ratio information is outputted at a DC output impedance of approximately 10k ohms and a DC input impedance of several hundred k ohms. Therefore, the chrominance signal 22 and the aspect ratio information can be multiplexed as described.

Figure 2:
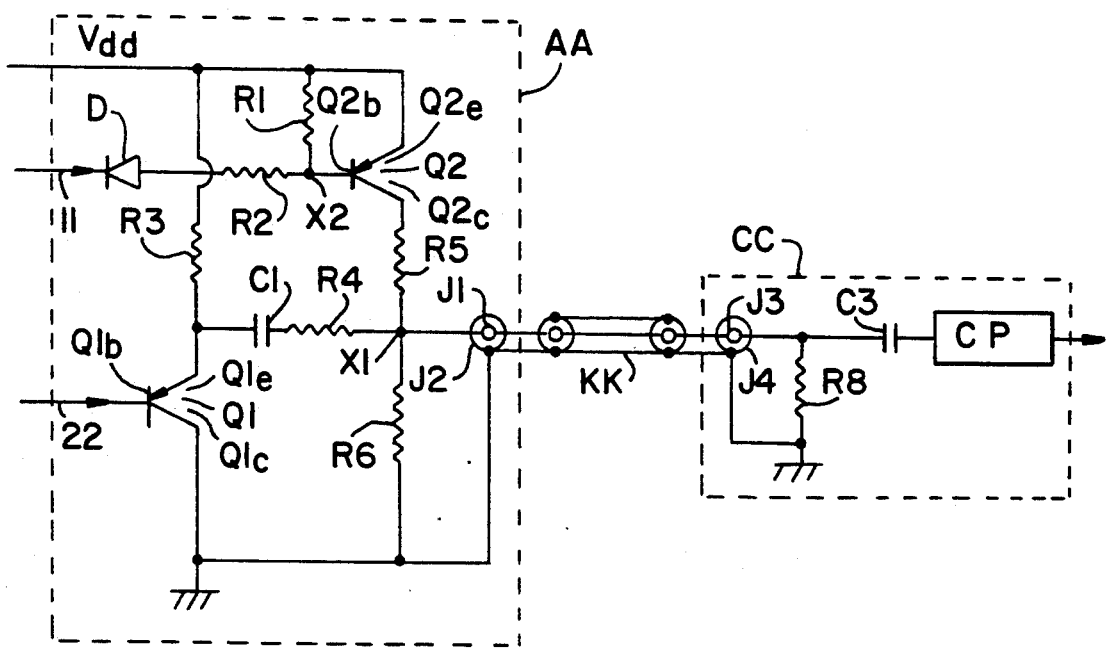
FIG. 2 is a schematic diagram illustrating the connection between the transmitter embodiment of FIG. 1 and a conventional receiving unit.

The junction between the sending side video unit relating to this invention and the conventional receiving side video unit will be described below with reference to FIG. 2. In FIG. 2, the same configurations as shown in FIG. 1 will be assigned the same numerals and the relevant explanations will be omitted.

The conventional receiving side video unit CC is connected to the sending side video unit AA through a transmission cable KK. Moreover, one of the S-terminals, i.e., the terminal J4 is grounded, while the contact J3 is coupled to one end of a resistor R8 whose other end is grounded. At the same time, the contact J3 is linked to one end of a third capacitor C3, whose other end is connected to the input side of a chrominance signal processing circuit CP.

It is conventional in the prior art to include a capacitor such as C3 to block any DC voltage superposed on the chrominance signal from reaching the chrominance processing circuits.

When the aspect ratio 16:9 is required, a chrominance signal with a DC voltage superposed is transmitted from the sending side video unit AA and is terminated at the eighth resistor R8. It is assumed that the output impedance of the sending side video unit AA holds at approximately 10K ohms as described earlier, and the resistance value of the eighth resistor R8, is 75 ohms. Given these conditions, the direct current that flows across the eighth resistor R8 will not develop an overcurrent because the direct current goes through the DC output impedance of the sending side video unit AA, which is approximately 10k ohms.

Moreover, the voltage imposed across the two ends of the eighth resistor R8 can be set to a minute value by selecting properly the DC output impedance and the DC voltage superposed on the chrominance signal 22. Therefore, even if the third capacitor C3 inside the conventional receiving side video unit CC is, for example, a polarized capacitor, it will not be polarized inversely. Therefore, the sending side video unit AA relating to this invention can be connected and operated with the conventional receiving side video unit CC without any problems.

In the above preferred embodiment, the chrominance signal using S-terminals has been utilized. There, the luminance signal is being transmitted from the sending side video unit AA to the receiving side video unit BB through a known transmission circuit.

The sending side video unit AA and the receiving side video unit BB can also be applied to the luminance signal, an the luminance signal with a DC voltage superposed can be transmitted for its discrimination on the receiving side. In such cases, it is necessary to define a sufficiently low cut-off frequency, which is determined by the first and second capacitors C1 and C2 and the fourth and seventh resistors R4 and R7. In this way the luminance signal containing a 30 Hz low frequency component can be transmitted without deterioration.

For this reason, the fourth and seventh resistors R4 and R7 have to be 75 ohms, for example, and the first and second capacitors C1 and C2 need to have large capacities. The general practice is to adopt polarized electrolytic capacitors as the large-capacity capacitors for their cost advantage. However, if polarized capacitors are to be used as the first and second capacitors C1 and C2, it is probable that they may be charged with an inverse polarity because of on-off operations of the transistor Q2 and, therefore, expensive, non-polarized capacitors will have to be employed as the first and second capacitors.

In view of this, the superposition of DC voltage on the chrominance signal rather than on the luminance signal in the manner described above permits use of small-capacity, non-polarized capacitors, since frequency components of the chrominance signal exist only in the high frequency range, with resultant advantages both in cost and in space.

As described above, the units of this sample embodiment can transmit aspect ratio switching information as well as chrominance and luminance signals by transmitting an ON/OFF DC control voltage superposed on the chrominance signal and/or the luminance signal and by discriminating the superposed DC voltage on the receiving side without providing another transmission path. In cases where the ON/OFF DC control voltage is superposed on the chrominance signal, small-capacity, non-polarized capacitors can be used as the first and second capacitors C2 and C1. This translates into savings in cost and space. In addition, the units are compatible with other conventional video equipment in general.

In the above preferred embodiment, the information conveyed by superposition of an ON/OFF DC control voltage was used to control the aspect ratio. It is true that information intended to control other features in the receiving side video unit may be provided utilizing the principles of the instant invention.

In the above sample embodiment, 2-bit information can be transmitted by superposing DC voltages on both the chrominance signal and the luminance signal, respectively.

In the above exemplary embodiment, the chrominance signal and the luminance signal are being transmitted using S-terminals. However, other arrangements can also be made to transmit the chrominance signal and the luminance signal without using S-terminals.

In the above exemplary embodiment, the sending side video unit may also be a TV receiver, for example, and the receiving side video unit, a Video Cassette Recorder, for example.

The embodiments recited above are the preferred embodiments of the instant invention, it will be understood that various modification may be made therein, and it is intended to cover in appended claims all such modification as fall within the true spirit and scope of the invention.

We claim:

1. A video apparatus for transmitting a control signal superposed on a video signal for controlling a desired response comprising:
   said video signal is a chrominance signal;
   means for converting a high impedance video signal to a low impedance video signal;
   means for superposing a control signal on said low impedance video signal;
   means for transmitting said video signal with said superposed control signal to a receiving device.

2. A video apparatus as in claim 1 wherein said control signal controls an aspect ratio of a video display device.

3. A video apparatus as in claim 1 wherein said control signal is an ON/OFF DC control signal.

4. A video apparatus as in claim 3 wherein said means for converting a high impedance video signal comprises:
   a first transistor with a capacitor and a first resistor serially coupled to the emitter of said transistor to provide a low AC impedance and a second resistor to provide a predetermined DC impedance for biasing said transistor.

5. A video apparatus as in claim 4 wherein means for superposing said ON/OFF DC signal on a low impedance video signal comprises:
   means for applying a DC control signal to a diode coupled to a resistor biasing network, such network coupled to a base of a second transistor whose emitter is coupled to a power source and whose collector is coupled to a resistor divider network, said resistor network being coupled at a junction thereof to an output of a low impedance amplifier.

6. A video apparatus for transmitting a control signal superposed on a video signal for controlling a desired response comprising:
   said video signal is a luminance signal;
   means for converting a high impedance video signal to a low impedance video signal;
   means for superposing a control signal on said low impedance video signal;
   means for transmitting said video signal with said superposed control signal to a receiving device.

7. A video apparatus as in claim 6 wherein said control signal controls an aspect ratio of a video display device.

8. A video apparatus as in claim 6 wherein said control signal is an ON/OFF DC control signal.

9. A video apparatus as in claim 8 wherein said means for converting a high impedance video signal comprises:
   a first transistor with a capacitor and first resistor serially coupled to the emitter of said transistor to provide a low AC impedance and a second resistor to provide a predetermined DC impedance for biasing said transistor.

10. A video apparatus as in claim 9 wherein means for superposing said ON/OFF DC signal on said low impedance video signal comprises:
    means for applying a DC control signal to a diode coupled to a resistor biasing network, such network coupled to a base of a second transistor whose emitter is coupled to a power source and whose collector is coupled to a resistor divider network, said resistor network being coupled at a junction thereof to an output of a low impedance amplifier.

11. A video apparatus for receiving a control signal superposed on a video signal for producing a desired video display comprising:
    means for detecting a control signal from a video signal carrying said control signal wherein said means is a dividing network comprising a capacitor and a resistor and a control signal discrimination circuit, said discrimination circuit responding only to said control signal;

an output of said dividing network is coupled to an input of a video amplifier, said dividing network responding only to said video signal;

said video amplifier for delivering said video signal to said video display device.

said discrimination circuit for delivering said control signal detected by said detecting means to a control device within a video display device, and 12. A video apparatus as in claim 11 wherein said control signal controls an aspect ratio of said video display device.

* * * * *